United States Patent
Qiao

(10) Patent No.: US 11,485,320 B2
(45) Date of Patent: Nov. 1, 2022

(54) METHOD AND APPARATUS FOR VEHICLE FUNCTION CONTROL, AND STORAGE MEDIUM

(71) Applicant: BEIJING XIAOMI MOBILE SOFTWARE CO., LTD., Beijing (CN)

(72) Inventor: Guangjun Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/357,853

(22) Filed: Jun. 24, 2021

(65) Prior Publication Data
US 2022/0242369 A1   Aug. 4, 2022

(30) Foreign Application Priority Data

Feb. 3, 2021  (CN) .......................... 202110152087.4

(51) Int. Cl.
  *B60R 25/24* (2013.01)
  *B60R 25/31* (2013.01)
  *H04B 17/318* (2015.01)
  *B60R 25/20* (2013.01)

(52) U.S. Cl.
  CPC .......... *B60R 25/245* (2013.01); *B60R 25/209* (2013.01); *B60R 25/31* (2013.01); *H04B 17/318* (2015.01); *B60R 2325/101* (2013.01); *B60R 2325/205* (2013.01)

(58) Field of Classification Search
  CPC ..... B60R 25/245; B60R 25/209; B60R 25/31; B60R 2325/101; B60R 2325/205; H04B 17/318
  See application file for complete search history.

(56) References Cited

U.S. PATENT DOCUMENTS

| | | | |
|---|---|---|---|
| 9,886,805 B1* | 2/2018 | Bianchi, III | G07C 9/00309 |
| 10,328,898 B2 | 6/2019 | Golsch et al. | |
| 2016/0098870 A1* | 4/2016 | Bergerhoff | H04W 4/48 340/5.61 |
| 2018/0099643 A1* | 4/2018 | Golsch | H04W 4/30 |
| 2019/0308613 A1* | 10/2019 | Lavoie | B60R 25/01 |

(Continued)

FOREIGN PATENT DOCUMENTS

| | | |
|---|---|---|
| CN | 105365774 A | 3/2016 |
| CN | 109484351 A | 3/2019 |
| CN | 111376865 A | 7/2020 |

(Continued)

OTHER PUBLICATIONS

European Patent Application No. 21182177.2, Search and Opinion dated Dec. 17, 2021, 11 pages.

(Continued)

*Primary Examiner* — Thomas D Alunkal
(74) *Attorney, Agent, or Firm* — Lathrop GPM LLP

(57) ABSTRACT

A method for vehicle function control includes: in response to determining that a distance between a vehicle and a terminal is within a bluetooth low energy (BLE) communication distance and the terminal has a digital vehicle key of the vehicle, establishing a BLE connection between the vehicle and the terminal and performing a BLE ranging; and when a BLE ranging result meets a preset condition, controlling the vehicle to unlock a door lock.

14 Claims, 4 Drawing Sheets

(56) References Cited

U.S. PATENT DOCUMENTS

2020/0336303 A1* 10/2020 Sierra ................... G01S 13/765
2021/0103046 A1* 4/2021 Waheed ................ G01S 13/765

FOREIGN PATENT DOCUMENTS

WO    WO 2019067105 A1    4/2019
WO    WO 2020247786 A1    12/2020

OTHER PUBLICATIONS

Chinese Patent Application No. 202110152087.4, Office Action dated Aug. 3, 2022; 8 pages.
Chinese Patent Application No. 202110152087.4, English translation of Office Action dated Aug. 3, 2022; 10 pages.

* cited by examiner

METHOD AND APPARATUS FOR VEHICLE FUNCTION CONTROL, AND STORAGE MEDIUM

CROSS REFERENCE TO RELATED APPLICATIONS

This application claims priority to Chinese Patent Application No. 202110152087.4, filed on Feb. 3, 2021, the content of which is incorporated herein by reference in its entirety.

TECHNICAL FIELD

The present disclosure relates to a field of vehicle control, and more particularly, to a method and an apparatus for vehicle function control, and a storage medium.

BACKGROUND

With the development of science and technology, function control is well-known as a common control method, and it appears in various scenes of daily life due to its wide application prospect. It is a hot topic to implement the function control on a vehicle with a digital vehicle key.

In the related art, a digital vehicle key is configured on a terminal for vehicle function control through a Near Field Communication (NFC) technology. However, NFC technology requires users to place the terminal with a digital vehicle key close to a vehicle. It may not provide a remote control function, a non-inductive door lock opening function or a startup function.

SUMMARY

According to a first aspect of the present disclosure, a method for vehicle function control applied to a vehicle includes: in response to determining that a distance between a vehicle and a terminal is within a bluetooth low energy (BLE) communication distance and the terminal has a digital vehicle key of the vehicle, establishing a BLE connection between the vehicle and the terminal and performing a BLE ranging; and when a BLE ranging result meets a preset condition, controlling the vehicle to unlock a door lock.

According to a second aspect of the present disclosure, a method for vehicle function control applied to a terminal includes: creating a digital vehicle key; obtaining digital vehicle key information, the digital vehicle key information being sent after it is detected by a vehicle that the terminal is located in the vehicle; and writing the digital vehicle key information into the created digital vehicle key to activate the created digital vehicle key.

According to a third aspect of the embodiment of the present disclosure, a vehicle includes: a processor and a memory configured to store instructions executable by the processor. The processor is configured to, in response to determining that a distance between the vehicle and a terminal is within a bluetooth low energy (BLE) communication distance and the terminal has a digital vehicle key of the vehicle, establish a BLE connection between the vehicle and the terminal and perform a BLE ranging; and when a BLE ranging result meets a preset condition, control the vehicle to unlock a door lock.

It should be noted that, the general descriptions above and the following details are exemplary and illustrative, and do not constitute the limitation to the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all implementations consistent with the present disclosure. Rather, they are merely examples of apparatuses and methods consistent with some aspects of the present disclosure.

The method for vehicle function control according to the present disclosure may be applied in a scenario where the user performs function control on the vehicle by a terminal. For example, it may be applied in a scenario where the user performs the function control on the vehicle by a terminal such as a mobile phone. A digital vehicle key of the vehicle is created and activated in the terminal.

In the related art, the NFC technology is adopted to achieve the terminal's control on the vehicle. For example, the user may create a digital vehicle key in the terminal such as a mobile phone, and when the terminal is close to a sensing apparatus installed on the vehicle, the user may control the vehicle to execute preset functions. For example, when the terminal is close to a sensing apparatus on the vehicle door of the main driver, the user may control the vehicle to unlock the door lock. The NFC technology requires the terminal close enough to the vehicle to achieve the vehicle function control. It may not provide a remote control function, a non-inductive door lock opening function and a non-inductive startup function. The non-inductive door lock opening function refers to automatically controlling a vehicle to unlock the door lock without active operation from a user when it is detected that the user approaching to the vehicle meets a preset condition. The non-inductive startup function refers to automatically controlling a vehicle to start an engine or an electric control center of the vehicle when it is detected that a user is located in the vehicle without active operation from the user.

Figure 1:
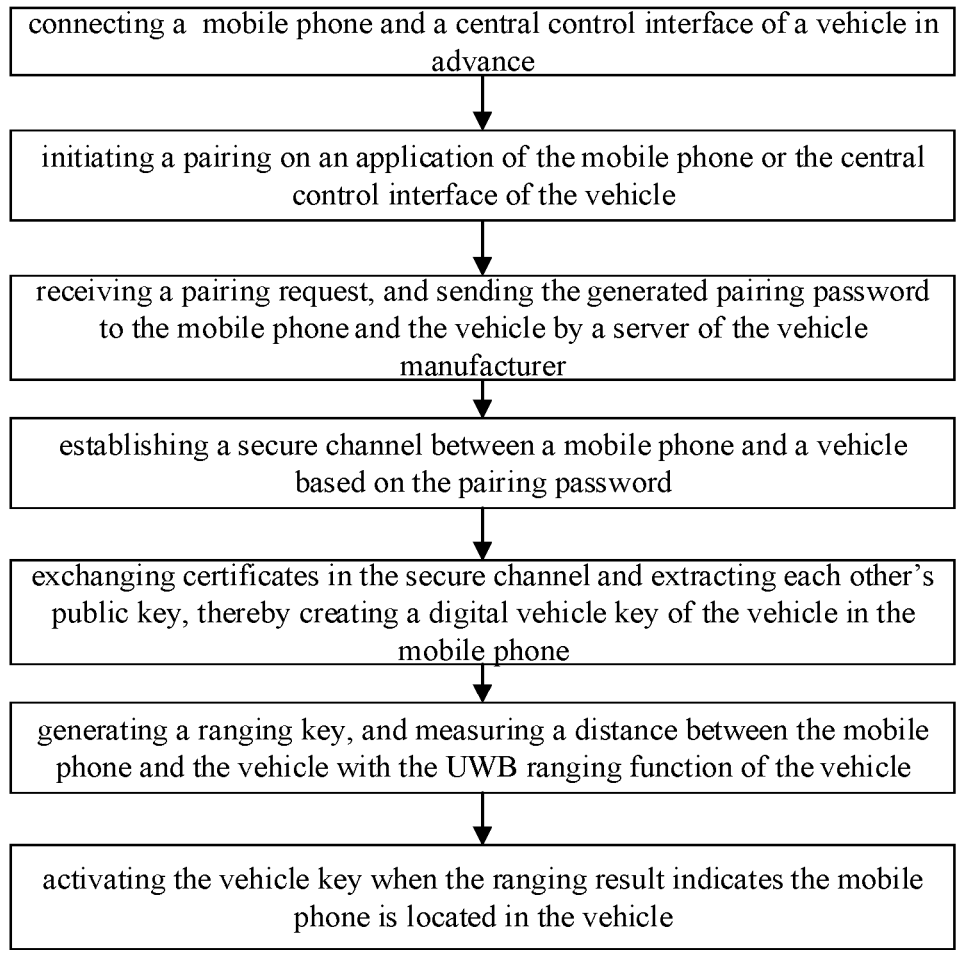
FIG. 1 is a diagram illustrating a method for vehicle function control based on the related art according to an example embodiment.
Figure 2:
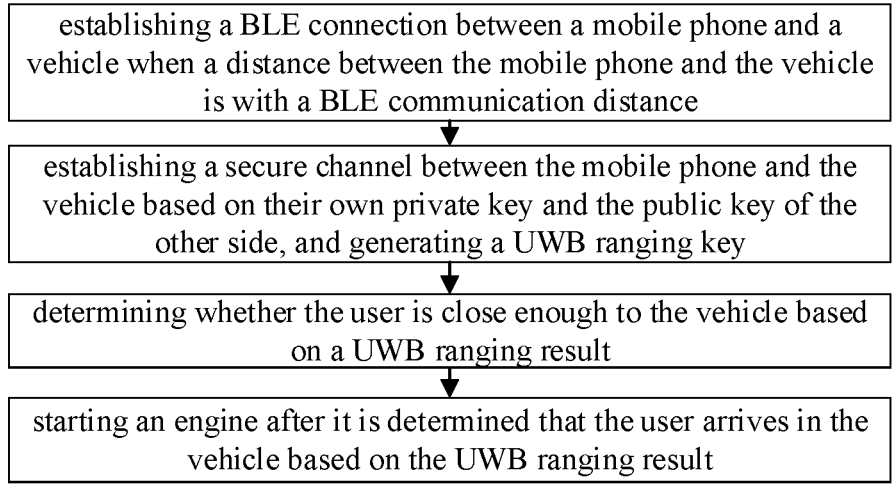
FIG. 2 is a diagram illustrating a method for creating and activating a digital vehicle key based on the related art according to an example embodiment.

In the related art, another method for vehicle function control is to apply an ultra wide band (UWB) technology based on the NFC technology, so as to achieve a remote control function, a non-inductive door lock opening function and a non-inductive startup function. In the method, a terminal is first paired with a vehicle, and a digital vehicle key of the vehicle is created in the terminal. For example, as illustrated in FIG. 1, a vehicle owner may connect a mobile phone and a vehicle in advance by scanning a QR code in a central control interface of the vehicle through a mobile phone, and initiate a pairing on an application of the mobile phone or the central control interface of the vehicle. A server of the vehicle manufacturer receives a pairing request, and sends the generated pairing password to the mobile phone and the vehicle. A secure channel between a mobile phone and a vehicle is established based on the pairing password. The mobile phone and the vehicle exchanges their certificates in the secure channel and extract each other's public key respectively, thereby creating a digital vehicle key of the vehicle in the mobile phone. The mobile phone and the vehicle generates a ranging key based on the public key of the other side and a ranging is activated based on the ranging key. The distance between the mobile phone and the vehicle is then measured with the UWB ranging function of the vehicle, and when the ranging result meets an activating condition, unique information of the vehicle key is written into the vehicle key of the mobile phone, such as an anti-theft signaling for the vehicle owner permission, so as to activate the vehicle key. In the method, after the digital vehicle key of the vehicle is created in the terminal, the digital vehicle key is used in the following way. For example, as illustrated in FIG. 2, when the distance between the mobile phone and the vehicle reaches or falls within a bluetooth low energy (BLE) communication distance, a secure channel between the mobile phone and the vehicle is established based on their own private key and the public key of the other side by establishing a BLE connection between the mobile phone and the vehicle, and a UWB ranging key is generated. It is determined whether the user is close enough to the vehicle based on the UWB ranging result. After it is determined that the user arrives in the vehicle, an engine or an electric control center of the vehicle is started. The method may provide a remote control function, a non-inductive door lock opening function and a non-inductive startup function, however, it requires to install a plurality of UWBs on the vehicle, with high power consumption and hardware cost.

In view of this, the embodiments of the present disclosure provide a method for vehicle function control. The BLE technology is configured for ranging, and when the BLE ranging result meets a preset condition, the vehicle is controlled to unlock the door lock. The vehicle function control is achieved by the method without installing additional UWBs, which reduces hardware cost and power consumption of the vehicle and the mobile phone.

Figure 3:
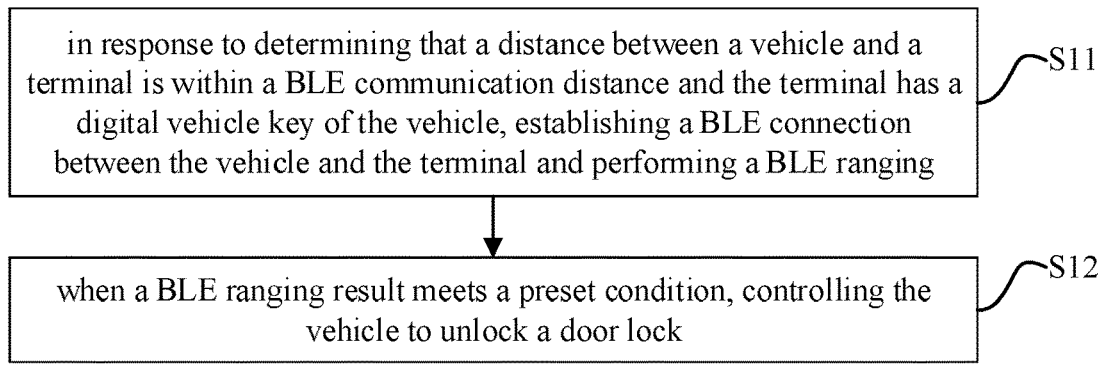
FIG. 3 is a flowchart illustrating a method for vehicle function control according to an example embodiment.

FIG. 3 is a flowchart illustrating a method for vehicle function control according to an example embodiment. As illustrated in FIG. 3, the method for vehicle function control is applied to an apparatus for vehicle function control, which may be a vehicle, and also may be a component in the vehicle. The method includes the following blocks:

At block S11, in response to determining that a distance between a vehicle and a terminal is within a BLE communication distance, and the terminal has a digital vehicle key of the vehicle, a BLE connection between the vehicle and the terminal is established and a BLE ranging is performed.

At block S12, when the BLE ranging result meets a preset condition, the vehicle is controlled to unlock a door lock.

The method for vehicle function control according to the present disclosure achieves the non-inductive door lock opening with the digital vehicle key based on the BLE technology, which may reduce cost with strong practicability compared with the UWB technology. In the present disclosure, after the distance between the vehicle and the terminal is within the BLE communication distance, the BLE connection is established between the vehicle and the terminal, and it is determined whether the terminal has a digital vehicle key of the vehicle.

In the method for vehicle function control according to the present disclosure, the digital vehicle key of the vehicle needs to be created and activated in the terminal in advance. The specific implementation process of creating and activating a digital vehicle key is described below.

The digital vehicle key for controlling the vehicle to implement the corresponding function in the present disclosure is activated in advance by: in response to detecting that the terminal in which the digital vehicle key has been created is located in the vehicle, writing digital vehicle key information of the vehicle into the created digital vehicle key in the terminal to activate the created digital vehicle key in the terminal.

Figure 4:
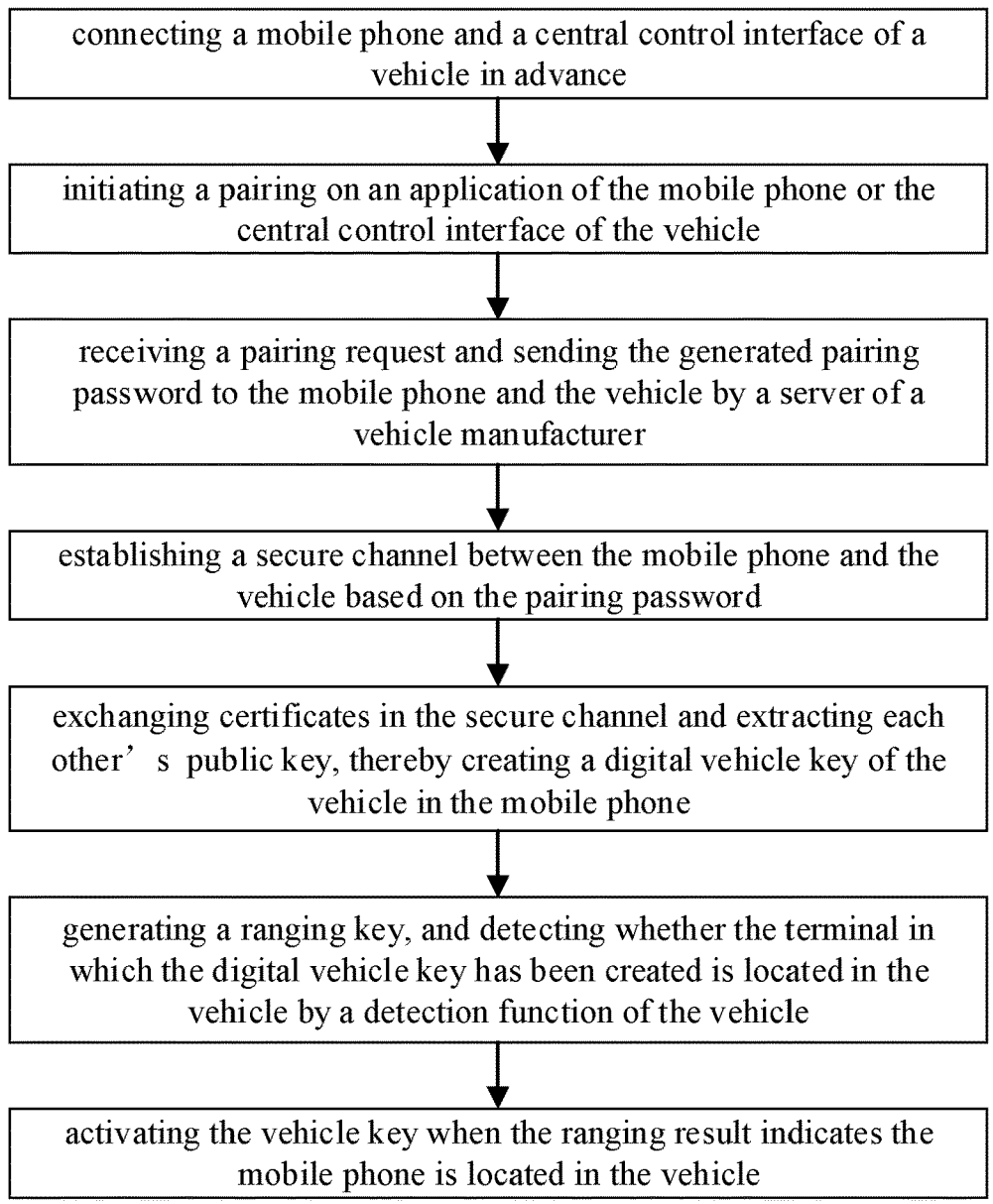
FIG. 4 is a diagram illustrating a method for creating and activating a digital vehicle key based on the method for vehicle function control according to an example embodiment.

FIG. 4 is a diagram illustrating a method for creating and activating a digital vehicle key based on the method for vehicle function control according to an example embodiment.

A vehicle owner may connect a terminal and a central control interface of a vehicle in advance by scanning a QR code in the central control interface of the vehicle through a mobile phone, and initiate a pairing on an application of the terminal or the central control interface of the vehicle. A server of the vehicle manufacturer receives a pairing request, and sends the generated pairing password to the terminal and the vehicle. A secure channel between a terminal and a vehicle is established based on the pairing password, the terminal and the vehicle exchanges their certificates in the secure channel and extracts each other's public key, thereby creating a digital vehicle key of the vehicle in the terminal. The terminal and the vehicle generate a ranging key based on the public key of the other side. It is detected whether the terminal in which the digital vehicle key has been created is located in the vehicle by the detection function of the vehicle. When the detection result indicates that the terminal in which the digital vehicle key has been created is located in the vehicle, unique information of the vehicle key is written into the vehicle key of the terminal, such as an anti-theft signaling for the vehicle owner permission, so as to activate the vehicle key. In an example, determining whether the terminal has a digital vehicle key of the vehicle may include determining whether the terminal has created a vehicle key that has been activated by the vehicle. When the terminal creates and activates a digital vehicle key, it is determined that the terminal has a digital vehicle key of the vehicle.

In another example, determining whether the terminal has a digital vehicle key of the vehicle may include whether the terminal has a security authentication code of the digital vehicle key. The security authentication code of the digital vehicle key is owned and shared to other terminals by the terminal that creates and activates the digital vehicle key. Other terminals perform vehicle function control based on the shared digital vehicle key. When the terminal has the security authentication code of the digital vehicle key, it is determined that the terminal has the digital vehicle key of the vehicle.

In an embodiment, a validity period may be set for a security authentication code of a digital vehicle key. When the security authentication code of the digital vehicle key expires, the created digital vehicle key is suspended and/or deleted. The suspended digital vehicle key may continue to be used after the user performs a recovering operation. Therefore, it is determined that the vehicle has the digital vehicle key of the vehicle by one or a combination of:

Manner 1: when the terminal is a first type of terminal, it is determined that the terminal has a digital vehicle key of the vehicle. The first type of terminal is installed with the digital vehicle key of the vehicle that has been created and activated;

Manner 2: when the terminal has a security authentication code of the digital vehicle key shared by the first type of terminal, it is determined that the terminal has the digital vehicle key of the vehicle.

Manner 3: when the terminal has a security authentication code of the digital vehicle key within a validity period, it is determined that the terminal has the digital vehicle key of the vehicle.

In the present disclosure, a ranging is performed between the terminal (in which the digital vehicle key has been created and activated) and the vehicle based on the BLE technology, and the corresponding function control is implemented. In the present disclosure, a BLE ranging is performed, which may be performed based on one or a combination of a received signal strength indication (RSSI), an angle-of-arrival (AoA) and an angle-of-departure (AoD) and a hybrid analog and digital modulation (HADM), so as to determine a distance between the terminal and the vehicle. For example, the RSSI of the terminal received by the vehicle is detected through the BLE, and the distance between the terminal and the vehicle may be judged based on the RSSI. For example, a ranging signal may be further sent to the terminal at a plurality of point positions of the vehicle, a plurality of AoAs are determined by receiving the ranging signal fed back by the terminal at the point positions, and a position relationship between the terminal and the vehicle is determined based on the plurality of AoAs, thereby determining the distance between the terminal and the vehicle.

In the present disclosure, a preset condition for the BLE ranging may be a preset condition corresponding to the ranging manner. For example, when the BLE ranging is performed based on the RSSI, the preset condition may be set to the RSSI being greater than or equal to a preset RSSI threshold. When the RSSI is greater than or equal to the RSSI threshold, it is determined that the BLE ranging result meets the preset condition.

The method for vehicle function control according to the present disclosure, the digital vehicle key may perform sharing, deletion and/or suspending functions.

The method for vehicle function control according to the present disclosure, a non-conductive door lock opening function and a non-conductive startup function of the vehicle may be implemented.

Figure 5:
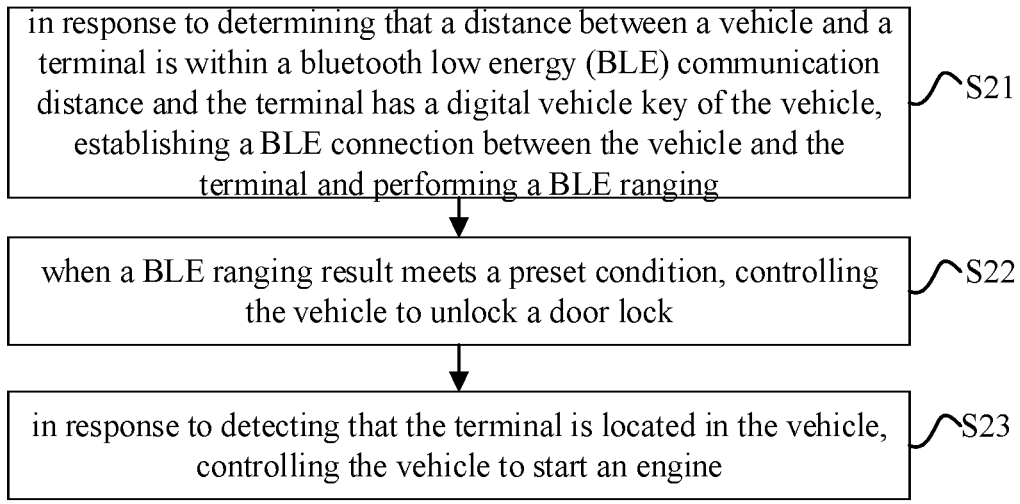
FIG. 5 is a flowchart illustrating a method for vehicle function control according to an example embodiment.

FIG. 5 is a flowchart illustrating a method for vehicle function control according to an example embodiment. As illustrated in FIG. 5, the method may include the following blocks. The implementation process at block S21 and block S22 is similar to that at block S11 and block S12 in FIG. 3. For the similarity, it is not repeated here.

At block S23, in response to detecting that the terminal is located in the vehicle, the vehicle is controlled to start an engine or an electric control center of the vehicle.

In the present disclosure, when the user arrives in the vehicle, by the user's triggering operation and/or detecting with a vehicle hardware device, it may be determined that the terminal is located in the vehicle, and the vehicle is further controlled to start an engine or an electric control center of the vehicle.

It may be detected that the terminal is located in the vehicle by one or a combination of: detecting that the central control interface of the vehicle is manipulated; detecting that a vehicle seat sensor is triggered; a button of the vehicle is touched; and detecting that a pedal of the vehicle is stepped on. It is determined that the terminal is located in the vehicle through the detection result, and the vehicle is controlled to start an engine or an electric control center of the vehicle.

In the present disclosure, after the distance between the vehicle and the terminal is within the BLE communication distance, the BLE connection is established, and the BLE ranging is performed on the vehicle and the terminal in which the digital vehicle key has been created. It is determined whether the distance between the terminal and the vehicle meets the preset condition for executing the unlocking function by the vehicle based on the BLE ranging result, and it is detected whether the terminal is located in the vehicle, thereby achieving the non-inductive door lock opening function and the non-inductive startup function of the vehicle.

In the method for vehicle function control according to the present disclosure, the terminal may create and activate a digital vehicle key in advance.

Figure 6:
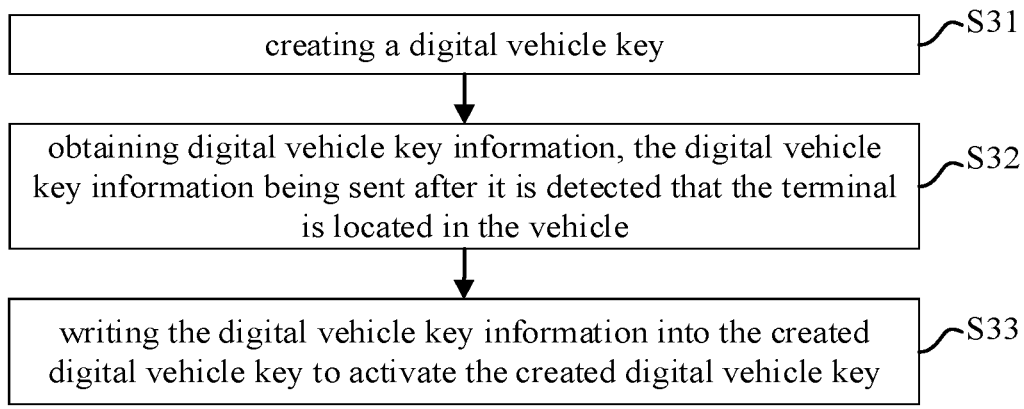
FIG. 6 is a flowchart illustrating a method for vehicle function control according to an example embodiment.

FIG. 6 is a flowchart illustrating a method for vehicle function control according to an example embodiment. As illustrated in FIG. 6, the method may include the following blocks.

At block S31, a digital vehicle key is created.

At block S32, digital vehicle key information is obtained. The digital vehicle key information is sent after it is detected by a vehicle that a terminal is located in the vehicle.

At block S33, the digital vehicle key information is written into the created digital vehicle key, and the created digital vehicle key is activated.

In the present disclosure, a digital vehicle key of the vehicle is created in the terminal so that the terminal possesses an ability to privately communicate with the vehicle. After the vehicle detects that the terminal is located in the vehicle, the terminal receives digital vehicle key information sent by the vehicle and writes the digital vehicle key information into the created digital vehicle key, thereby activating the created digital vehicle key in the terminal.

In the method for vehicle function control according to the present disclosure, in response to the terminal having an activated digital vehicle key of the vehicle, a BLE ranging may be performed based on the digital vehicle key, thereby achieving the non-conductive door lock open function and the non-conductive startup function of the vehicle.

In the method for vehicle function control according to the present disclosure, in response to determining that the distance between the terminal and the vehicle is within the BLE communication distance and the terminal has the digital vehicle key of the vehicle, the BLE connection between the vehicle and the terminal is established and the BLE ranging is performed. The vehicle performs the non-conductive door lock open function and the non-conductive startup function based on the BLE ranging result determined by the terminal.

In the method for vehicle function control according to the present disclosure, a terminal may share the created and activated digital vehicle key of the vehicle to other terminals.

In the method for vehicle function control according to the present disclosure, the terminal may share the digital vehicle key of the vehicle by the following way.

In an implementation, when the terminal obtains a digital vehicle key sharing instruction, a security authentication code of the digital vehicle key for the vehicle may be generated and shared to other terminals. For example, the user may operate to trigger a digital vehicle key sharing instruction, the terminal may generate and share a security authentication code of the digital vehicle key to other terminals, and other terminals may perform the function control on the vehicle through the security authentication code of the digital vehicle key. The security authentication code of the digital vehicle key may be an information code with a vehicle public key and a vehicle function control permission.

In an example, a security authentication code of the digital vehicle key generated by the terminal may be a security authentication code of the digital vehicle key carrying a time stamp. For example, an effective time and a failure time of the security authentication code of the digital vehicle key may be configured so that the security authentication code of the digital vehicle key carries a time stamp. When other terminals obtain the security authentication code of the digital vehicle key of the vehicle within a validity period, the terminal may perform the function control on the vehicle. When the security authentication code of the digital vehicle key expires, the digital vehicle key is suspended and/or deleted.

The method for vehicle function control according to the present disclosure, a remote control function of the vehicle may be achieved.

In an implementation, a function control button may be set in the terminal, to achieve the remote control function of the digital vehicle key. In an example, a function control button for unlocking the door lock may be triggered by the user, to control the vehicle to execute the function of unlocking the door lock. The remote control function of the digital vehicle key includes door locking, door unlocking and engine starting functions of the vehicle.

The method for vehicle function control according to the present disclosure is applied to implement a bluetooth digital vehicle key based on a public key system. In an embodiment, taking a mobile phone as a terminal, vehicle function control may be performed by the following way:

Stage one: creation and activation of a digital vehicle key

First, when the vehicle owner initiates a pairing, that is, creating the digital vehicle key of the vehicle owner, the vehicle owner may initiate the pairing on the application of the mobile phone or the central control interface of the vehicle. The vehicle manufacturer's server generates a pairing password and sends to the vehicle owner's mobile phone. The mobile phone and the vehicle utilize the transmitted pairing password, and an SPKE 2+protocol is utilized to generate a session key with strong security from the pairing password, to establish a secure channel. The mobile phone and the vehicle exchange certificates in the established secure channel, extract the public key of the other side in the certificates, thereby creating a vehicle key. When the vehicle determines that the user is located in the vehicle (such as through a seat sensor, or a user clicks the control interface, etc.), the vehicle communicate with the mobile phone via the secure channel, and the unique information of the vehicle key is written into the vehicle key of the mobile phone, such as the anti-theft signaling, to activate the vehicle key.

Stage two: application of a digital vehicle key

When the user holding the mobile phone is close to the vehicle, a bluetooth connection between the vehicle and the mobile phone is established. The vehicle and the mobile phone generate a session key with the public key of the other side and its own private key, then a secure channel is established, and the identity of the other side is verified. On the premise of confirming the identity of the other side, a secure ranging is enabled with the BLE ranging key. The BLE ranging may be an RSSI-based ranging, or may be an AoA/AoD-based ranging, or may be a HADM-based ranging. The specific ranging mode adopted may depend on the implementation of the vehicle manufacturer. When the vehicle determines that the BLE ranging information reaches a preset condition, the door lock is unlocked. When it is detected that the user arrives in the vehicle (which may be determined by a sensor, a button or a pedal, etc., depending on the vehicle manufacturer), an engine or an electric control center of the vehicle is started.

Based on the same concept, the embodiments of the present disclosure further provide an apparatus for vehicle function control.

It could be understood that, the apparatus for vehicle function control according to the present disclosure contains hardware structures and/or software modules that execute various functions in order to implement the above functions. In combination with the units and algorithm steps of the examples described in embodiments of the present disclosure, the embodiments of the present disclosure may be implemented in hardware or a combination of hardware and computer software. Whether a function is executed in hardware or computer software driven by hardware depends on the specific application and design constraints of the technical solution. Those skilled in the art may adopt different methods for each specific application to implement the described functions, but such implementation should not be considered as going beyond the scope of the technical solutions of embodiments of the present disclosure.

Figure 7:
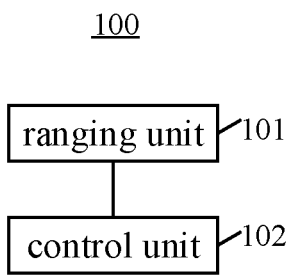
FIG. 7 is a block diagram illustrating an apparatus for vehicle function control according to an example embodiment.

FIG. 7 is a block diagram illustrating an apparatus for vehicle function control according to an example embodiment. Referring to FIG. 7, the apparatus 100 includes a ranging unit 101 and a control unit 102.

The ranging unit 101 is configured to, in response to determining that a distance between a vehicle and a terminal is with a bluetooth low energy (BLE) communication distance and the terminal has a digital vehicle key of the vehicle, establish a BLE connection between the vehicle and the terminal and perform a BLE ranging. The control unit 102 is configured to, when a BLE ranging result meets a preset condition, control the vehicle to unlock a door lock.

In an embodiment, the control unit 102 is further configured to: in response to detecting that the terminal is located in the vehicle, control the vehicle to start an engine or an electric control center of the vehicle.

In an embodiment, the ranging unit 101 activates the digital vehicle key in advance by: in response to detecting that the terminal in which the digital vehicle key has been created is located in the vehicle, writing digital vehicle key information of the vehicle into the created digital vehicle key in the terminal to activate the created digital vehicle key in the terminal.

In an embodiment, the control unit 102 determines that the terminal is located in the vehicle in response to meeting at least one of: detecting that the terminal is located in the vehicle; detecting that a central control interface of the vehicle is manipulated; detecting that the vehicle seat sensor is triggered; detecting that a button of the vehicle is touched; detecting that a pedal of the vehicle is stepped on.

In an embodiment, the ranging unit 101 performs a BLE ranging based on at least one of a received signal strength indication (RSSI); an angle-of-arrival (AoA) and an angle-of-departure (AoD); and a hybrid analog and digital modulation (HADM).

In an embodiment, the control unit 102 determines that the vehicle has the digital vehicle key of the vehicle by one or a combination of: when the terminal is a first type of terminal, determining that the terminal has the digital vehicle key of the vehicle, the first type of terminal being a terminal installed with the digital vehicle key of the vehicle that has been created and activated; when the terminal has a security authentication code of the digital vehicle key shared by the first type of terminal, it is determined that the terminal has the digital vehicle key of the vehicle; and when the terminal has a security authentication code of the digital vehicle key within a validity period, it is determined that the terminal has the digital vehicle key of the vehicle.

In an embodiment, the control unit 102 is further configured to: in response to the security authentication code of the digital vehicle key expired, suspend and/or delete the digital vehicle key used by the terminal.

Based on the same concept, the embodiments of the present disclosure further provide an apparatus for vehicle function control.

Figure 8:
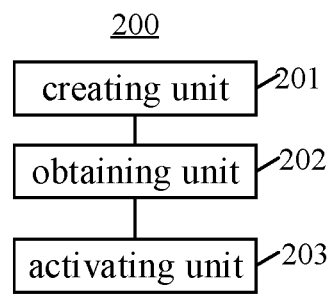
FIG. 8 is a block diagram illustrating another apparatus for vehicle function control according to an example embodiment.

FIG. 8 is a block diagram illustrating another apparatus for vehicle function control according to an example embodiment. Referring to FIG. 8, the apparatus 200 includes a creating unit 201, an obtaining unit 202 and an activating unit 203.

The creating unit 201 is configured to create a digital vehicle key. The obtaining unit 202 is configured to obtain digital vehicle key information, in which, the digital vehicle key information is sent after it is detected by a vehicle that the terminal is located in the vehicle. The activating unit 203 is configured to write the digital vehicle key information into the created digital vehicle key, and activate the created digital vehicle key.

Figure 9:
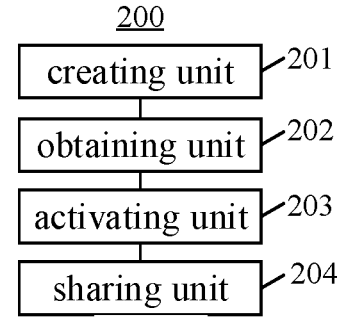
FIG. 9 is a block diagram illustrating another apparatus for vehicle function control according to an example embodiment.

In an embodiment, the apparatus for vehicle function control further includes a sharing unit 204, as illustrated in FIG. 9. FIG. 9 is a block diagram illustrating another apparatus for vehicle function control according to an example embodiment. Referring to FIG. 9, the sharing unit 204 is configured to, in response to obtaining a digital vehicle key sharing instruction, generate and share a security authentication code of the digital vehicle key of the vehicle.

In an embodiment, the sharing unit 204 is further configured to carry a time stamp in the generated security authentication code of the digital vehicle key.

With regard to the apparatus in the above embodiments, the specific way in which each module performs the operation has been described in detail in the embodiments of the method and will not be elaborated here.

Figure 10:
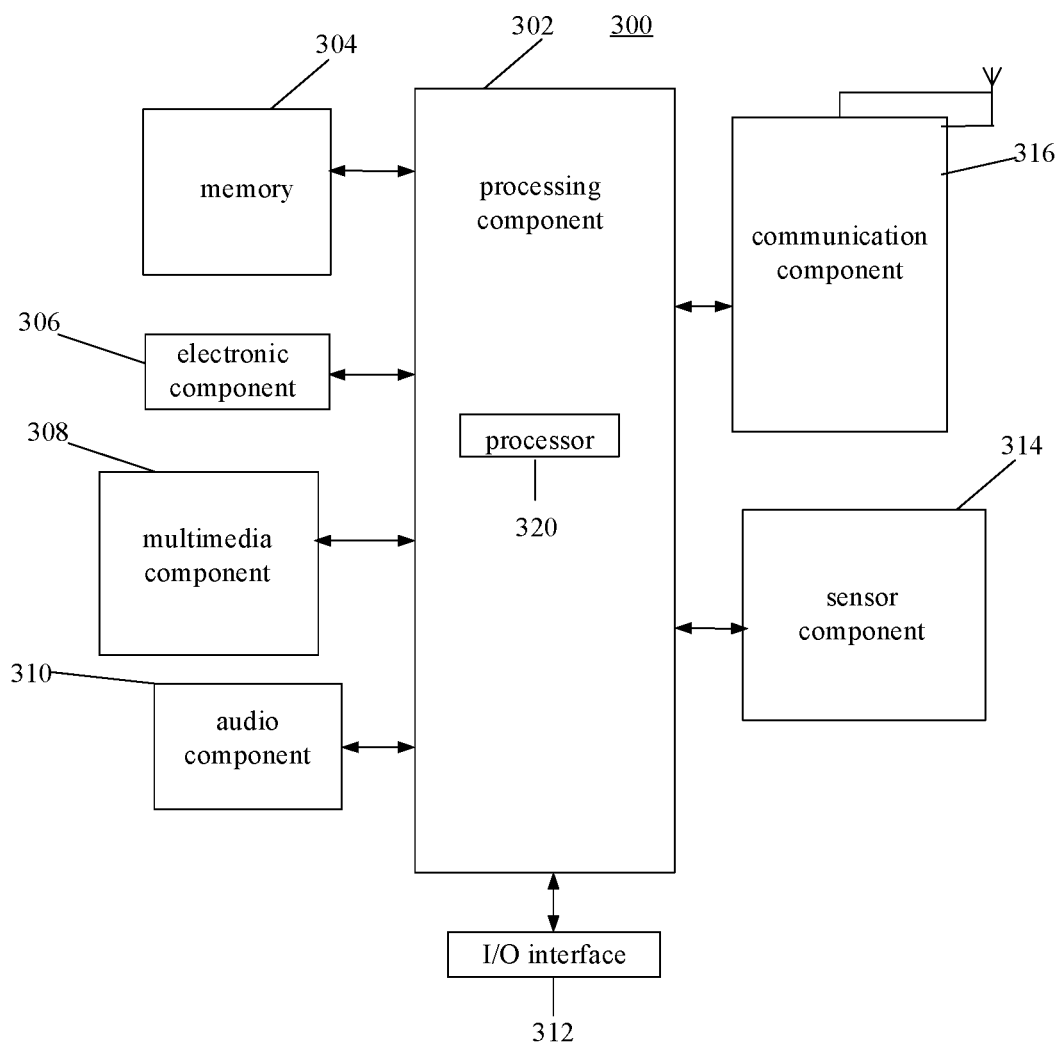
FIG. 10 is a block diagram illustrating a device for vehicle function control according to an example embodiment.

FIG. 10 is a block diagram illustrating a device 300 for vehicle function control according to an example embodiment. For example, the device 300 may be a vehicle or may be a terminal. The terminal may be a mobile phone, a computer, a digital broadcasting terminal, a messaging device, a game console, a tablet device, a medical equipment, a fitness equipment, a personal digital assistant, etc.

Referring to FIG. 10, the device 300 may include one or more components: a processing component 302, a memory 304, a power supply component 306, a multimedia component 308, an audio component 310, an input/output (I/O) interface 312, a sensor component 314, and a communication component 316.

The processing component 302 generally controls the overall operation of the device 300, such as the operations related to display, phone calls, data communications, camera operations and recording operations. The processing component 302 may include one or more processors 320 for executing instructions to complete all or part of blocks of the above method. In addition, the processing component 302 may include one or more modules for the convenience of controls between the processing component 302 and other components. For example, the processing component 302 may include a multimedia module for the convenience of controls between the multimedia component 308 and the processing component 302.

The memory 304 is configured to store various types of data to support the operation of the device 300. Examples of such data include instructions for any applications or methods operating on the device 300, contact data, phone book data, messages, pictures, videos, etc. The memory 304 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 306 may provide power to various components of the device 300. The power supply component 306 may include a power management system, one or more power supplies, and other components related to generating, managing and distributing power for the device 300.

The multimedia component 308 includes a screen that provides an output interface between the device 300 and the user. In some embodiments, a screen may include a liquid crystal display (LCD) and a touch panel (TP). If the screen includes a touch panel, the screen may be implemented as a touch screen to receive input signals from the user. The touch panel includes one or more touch sensors to sense touches, swipes and gestures on the touch panel. The touch sensors may not only sense a boundary of the touch or swipe action, but also sense a duration and a pressure related to the touch or swipe action. In some embodiments, the multimedia component 308 include a front camera and/or a rear camera. When the device 300 is in an operation mode, such as shooting mode or video mode, the front camera or the rear camera may receive external multimedia data. Each of the front camera and rear camera may be a fixed optical lens system or an optical lens system or have focal length and optical zoom capacity.

The audio component 310 is configured as output and/or input signal. For example, the audio component 310 includes a microphone (MIC). When the device 300 is in an operation mode, such as a call mode, a recording mode, and a speech recognition mode, the microphone is configured to receive external audio signals. The audio signals received may be further stored in the memory 304 or sent via the communication component 316. In some embodiments, the audio component 310 further includes a speaker to an output audio signal.

The I/O interface 312 provides an interface for the processing component 302 and the peripheral interface module, and the peripheral interface module may be a keyboard, a click wheel, a button, etc. These buttons may include but not limited to a home button, a volume button, a start button and a lock button.

The sensor component 314 includes one or more sensors for providing the device 300 with various aspects of state evaluation. For example, the sensor component 314 may detect an on/off state of the device 300 and relative positioning of the component such as the display and the keypad of the device 300. The sensor component 314 may further detect a location change of the device 300 or a component of the device 300, a presence or absence of user contact with the device 300, an orientation or an acceleration/deceleration of the device 300, and a temperature change of the device 300. The sensor component 314 may include a proximity sensor, which is configured to detect the presence of the objects nearby without any physical contact. The sensor component 314 may further include a light sensor such as a CMOS or CCD image sensor for use in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the device 300 and other devices. The device 300 may access wireless networks based on a communication standard, such as WiFi, 2G or 3G, or their combination. In an exemplary embodiment, the communication component 316 receives broadcast signals or broadcast-related information from an external broadcast management system via a broadcast channel. In an exemplary embodiment, the communication component 316 further includes a near field communication (NFC) module to facilitate short-range communication. For example, the NFC module may be implemented based on a radio frequency identification (RFID) technology, an infrared data association (IRDA) technology, an ultra-wideband (UWB) technology, a bluetooth (BT) technology and other technologies.

In an exemplary embodiment, the device 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-transitory computer readable storage medium is further provided, such as the memory 304, including instructions. The instructions may be executed by the processor 320 of the device 300 to complete the above methods. For example, the non-transitory computer readable storage medium may be a ROM, a random access memory (RAM), a CD-ROM, a magnetic tape, a floppy disk, an optical data storage device, etc.

It may be understood that, "a plurality of" in the present disclosure means two or above, which is similar to other quantifiers. The term "and/or" describes a relationship of the association objects, indicating that there may be three relationships, for example, A and/or B may represent: any of existing A only, existing both A and B, or existing B only. The character "/" generally means there is a "or" relationship between the objects before and after "/". The singular forms "a", "the" and "said are also intended to include plural forms, unless the context clearly indicates otherwise.

It may be also understood that, although the terms "first", "second", "third", etc. may be configured to describe various information, such information shall not be limited to these terms. These terms are only used to distinguish the same type of information, rather than to indicate a particular order or an importance degree. In fact, "first", "second" and other similar descriptions may be used interchangeably. For example, without departing from the scope of the present disclosure, first information may also be referred to as second information, and similarly, second information may also be referred to as first information.

It may be also understood that, unless specifically stated otherwise, a "connection" includes a direct connection between the two components without other components, or an indirect connection between the two components with other components.

It may be also understood that, even though the operations are described in the drawings in a particular order, such operations should not be required to be performed in the particular order shown or in a sequential order, or all the operations should be required to be performed to obtain desirable results. In certain circumstances, a multi-task and parallel processing may be advantageous.

Other implementations of the present disclosure will be apparent to those skilled in the art from consideration of the specification and practice of the present disclosure herein. The present application is intended to cover any variations, usages, or adaptive changes of the present disclosure which follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present invention is not limited to the precise structure described above and shown in the drawings, and various modifications and changes may be made without departing from its scope. The scope of the claimed invention is only limited by the appended claims.

What is claimed is:

1. A method for vehicle function control, applied to a vehicle, comprising:
   in response to determining that a distance between a vehicle and a terminal is within a bluetooth low energy (BLE) communication distance and the terminal has a digital vehicle key of the vehicle, establishing a BLE connection between the vehicle and the terminal and performing a BLE ranging; and
   when a BLE ranging result meets a preset condition, controlling the vehicle to unlock a door lock;
   wherein, the digital vehicle key is activated in advance by:
   in response to detecting that the terminal in which the digital vehicle key has been created is located in the vehicle, writing digital vehicle key information of the vehicle into the created digital vehicle key in the terminal to activate the created digital vehicle key in the terminal.

2. The method of claim 1, further comprising:
   in response to detecting that the terminal is located in the vehicle, controlling the vehicle to start an engine or an electric control center of the vehicle.

3. The method of claim 2, wherein, determining that the terminal is located in the vehicle in response to detecting that at least one of:

a central control interface of the vehicle is manipulated;
a vehicle seat sensor is triggered;
a button of the vehicle is touched; and
a pedal of the vehicle is stepped on.

4. The method of claim 1, wherein, the BLE ranging is performed based on at least one of a received signal strength indication (RSSI), an angle-of-arrival (AoA) and an angle-of-departure (AoD) and a hybrid analog and digital modulation (HADM).

5. The method of claim 1, wherein, determining that the terminal has the digital vehicle key of the vehicle comprises at least one of:
   when the terminal is a first type of terminal, determining that the terminal has the digital vehicle key of the vehicle, the first type of terminal being installed with the digital vehicle key of the vehicle that has been created and activated;
   when the terminal has a security authentication code of the digital vehicle key shared by the first type of terminal, determining that the terminal has the digital vehicle key of the vehicle; and
   when the terminal has a security authentication code of the digital vehicle key within a validity period, determining that the terminal has the digital vehicle key of the vehicle.

6. The method of claim 5, further comprising:
   in response to the security authentication code of the digital vehicle key expired, suspending and/or deleting the digital vehicle key used by the terminal.

7. A vehicle, comprising:
   a processor; and
   a memory configured to store instructions executable by the processor;
   wherein, the processor is configured to
   in response to determining that a distance between the vehicle and a terminal is within a bluetooth low energy (BLE) communication distance and the terminal has a digital vehicle key of the vehicle, establish a BLE connection between the vehicle and the terminal and perform a BLE ranging; and
   when a BLE ranging result meets a preset condition, control the vehicle to unlock a door lock;
   wherein the processor is further configured to write digital vehicle key information of the vehicle into the created digital vehicle key in the terminal to activate the created digital vehicle key in the terminal, in response to detecting that the terminal in which the digital vehicle key has been created is located in the vehicle.

8. The vehicle of claim 7, wherein the processor is further configured to:
   in response to detecting that the terminal is located in the vehicle, control the vehicle to start an engine or an electric control center of the vehicle.

9. The vehicle of claim 8, wherein the processor is further configured to determine that the terminal is located in the vehicle in response to detecting that at least one of:
   a central control interface of the vehicle is manipulated;
   a vehicle seat sensor is triggered;
   a button of the vehicle is touched; and
   a pedal of the vehicle is stepped on.

10. The vehicle of claim 7, wherein the processor is further configured to perform the BLE ranging based on at least one of a received signal strength indication (RSSI), an angle-of-arrival (AoA) and an angle-of-departure (AoD) and a hybrid analog and digital modulation (HADM).

11. The vehicle of claim 7, wherein the processor is further configured to determine that the terminal has the digital vehicle key of the vehicle by at least one of:
   determining that the terminal is a first type of terminal which is installed with the digital vehicle key of the vehicle that has been created and activated;
   determining that the terminal has a security authentication code of the digital vehicle key shared by the first type of terminal; and
   determining that the terminal has a security authentication code of the digital vehicle key within a validity period.

12. The vehicle of claim 11, wherein the processor is further configured to suspend and/or delete the digital vehicle key used by the terminal in response to the security authentication code of the digital vehicle key expired.

13. The vehicle of claim 11, wherein the security authentication code includes a time stamp.

14. The vehicle of claim 13, wherein the digital vehicle key information of the vehicle is received and written by the terminal into the digital vehicle key created in the terminal to activate the digital vehicle key.

* * * * *